3,513,127
POLYESTERS, POLYAMIDES, AND POLYESTER-AMIDES OF MIXTURES OF NITRILOTRIACETIC AND HYDROXYETHYLIMINODIACETIC ACIDS

Nelson S. Marans, Silver Spring, Md., assignor to W. R. Grace & Co., New York, N.Y., a corporation of Connecticut
No Drawing. Filed Oct. 10, 1968, Ser. No. 766,615
Int. Cl. C08g 17/04, 20/00, 20/30
U.S. Cl. 260—77
4 Claims

ABSTRACT OF THE DISCLOSURE

A process for preparing a novel crosslinked polymer, comprising heating at about 130–200° C. for about 10–1000 minutes in an inert liquid medium, a reaction mixture consisting essentially of a first compound having the formula HO—G—OH, $H_2N$—G—$NH_2$, or HO—G—$NH_2$ wherein G is an alkyl group having about 2–12 carbon atoms, hydroxyethyliminodiacetic acid, and nitrilotriacetic acid to form the polymer and water while continuously removing the water substantially as it is formed; separating the polymer from the reaction mixture; and recovering the separated polymer.

BACKGROUND OF THE INVENTION

This invention is in the field of polymers and polymer preparation. It is directed to the preparation of a crosslinked polymer from hydroxyethyliminodiacetic acid

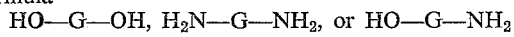
(HO—$CH_2CH_2$—N=($CH_2COOH$)$_2$)

nitrilotriacetic acid (N≡($CH_2COOH$)$_3$), and a member selected from the group consisting of HO—G—OH, $H_2N$—G—$NH_2$, and HO—G—$NH_2$, wherein G is an alkylene (divalent alkyl) group having 2–12 (preferably 2–6) carbon atoms; it is also directed to said polymer per se which is an excellent chelating agent for ions of transition group elements—the transition group elements being those elements having atomic numbers 21–32, 39–51, and 57–83—from aqueous solution or from organic solvents.

SUMMARY OF THE INVENTION

In summary this invention is directed to a process for preparing a crosslinked polymer comprising:

(a) Heating at about 130–200° C. for about 10–1000 minutes in an inert liquid reaction medium boiling at about 130–260° C. at 760 millimeters a reactive mixture consisting essentially of a first compound having the formula HO—G—OH, $H_2N$—G—$NH_2$, or HO—G—$NH_2$, wherein G is an alkylene (divalent alkyl) group having about 2–12 carbon atoms, hydroxyethyliminodiacetic acid, and nitrilotriacetic acid, the mole ratio of first compound:hydroxyethyliminodiacetic acid:nitrilotriacetic acid being about 1:0.2–0.8:0.2–0.8, the weight ratio of first compound to inert liquid reaction medium being about 1:1–20, to form the crosslinked polymer and water while continuously removing the water substantially as it is formed;

(b) Separating the crosslinked polymer from the inert reaction medium; and (c) Recovering the separated crosslinked polymer.

DESCRIPTION OF PREFERRED EMBODIMENTS

In preferred embodiments of the process set forth in the above summary:

(1) G is an alkylene group having about 2–6 carbon atoms;

(2) The mole ratio of first compound:hydroxyethyliminodiacetic acid:nitrilotriacetic acid is about

1:0–3.7–0.3–0.7 and (3) The reaction mixture is heated at about 135–180° C.

In another preferred embodiment (Embodiment A) this invention is directed to a crosslinked polymer excellently adapted for chelating transition metal ions from aqueous solutions and from organic solvents, said polymer being prepared by a process comprising:

(a) Heating at about 130–200° C. for about 10–1000 minutes in an inert liquid reaction medium boiling at about 130–260° C. at 760 millimeters of mercury a reaction mixture consisting essentially of a first compound having the formula HO—G—OH, $H_2N$—G—$NH_2$, or HO—G—$NH_2$, wherein G is an alkylene group having about 2–12 carbon atoms, hydroxyethyliminodiacetic acid, and nitrilotriacetic acid, the mole ratio of first compound:hydroxyethyliminodiacetic acid:nitrilotriacetic acid being about 1:0.2–0.8:0.2–0.8, the weight ratio of first compound to inert liquid reaction medium being about 1:1–20, to form the crosslinked polymer and water while continuously removing the water substantially as it is formed;

(b) Separating the crosslinked polymer from the inert reaction medium; and (c) Recovering the separated crosslinked polymer.

In preferred embodiments of the polymer described in Embodiment A:

(1) G is an alkylene group having about 2–6 carbon atoms.

(2) The mole ratio of first compound:hydroxyethyliminodiacetic acid:nitrilotriacetic acid is about 180° C.

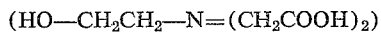
1:0.3–0.7:0.3–0.7

(3) The reaction mixture is heated at about 135–180° C.

DETAILED DESCRIPTION OF THE INVENTION

As stated supra, the novel crosslinked polymer of this invention is prepared by reacting in an inert liquid medium (inert solvent) boiling at about 120–260° C. at 760 millimeters of mercury absolute pressure a reacting mixture consisting essentially of; (a) a first compound having the formula HO—G—OH, $H_2N$—G—$NH_2$, or HO—G—$NH_2$, wherein G is an alkylene group having about 2–12 carbon atoms; (b) hydroxyethyliminodiacetic acid; and (c) nitrilotriacetic acid to form and crosslinked polymer and water.

Water is removed from the reactive mixture continuously and substantially as it (the water) is formed. A preferred method for removing the water comprises using as inert liquid medium an inert solvent such as xylene, ethylbenzene, or the like in which water is substantially insoluble and refluxing the mixture of inert medium and reacting mixture while condensing the vapors and collecting the resulting condensate in a water separating trap (e.g. a Dean-Stark trap or a Barrett trap, or the like), wherein the water is separated from the inert solvent, and returning the substantially water-free inert solvent (which may contain a portion of the amine) to the refluxing reacting mixture.

Other methods for removing water substantially as it is formed will be readily apparent to those skilled in the art. One such method comprises continuously withdrawing a slip, or side, stream of liquid e.g., condensed vapor or a portion of the refluxing mixture) separating any precipitated polymer from the slip stream (e.g., by filtration, decantation, or centrifugation,), returning the thus separated polymer to the heated mixture, contacting the slip stream with a desiccant or a water absorbing material (preferably after cooling the slip stream) such as silica gel or alumina gel to remove water from the inert solvent component of the slip stream, and returning the thus contacted and now substantially water-free liquid to the reacting mixture.

When the reaction is completed or substantially completed (as determined by any convenient means, e.g., by elimination (separation) of the theoretical quantity of water or by analysis of a sample of the reacting mixture), the thus formed first intermediate polymer can be separated from the liquid medium preferably by distilling or vaporizing the medium from said polymer and more preferably by conducting the distillation under reduced pressure. Precipitated polymer (polymer which is substantially insoluble in the inert liquid medium) can be separated from the inert medium by decantation, centrifugation, or filtration.

The thus separated polymer can be recovered. If desired the separated polymer can be dried (substantially freed of inert solvent) before being recovered.

It is an object of this invention to prepare a polymer.

It is another object to prepare a novel crosslinked polymer.

It is still another object to prepare a novel crosslinked polymer that is an excellent chelating agent for iron ions, especially iron(III) ions.

It is still a further object to prepare a novel polymer that is an excellent chelating agent for positive ions of transition group elements.

The following examples are set forth by way of illustration, and it is understood that the instant invention is not to be construed as being limited by said examples or by the details therein.

EXAMPLE I

A mixture of 12 grams (g.) of ethylenediamine, 17.7 g. of hydroxyethyliminodiacetic acid and 19.1 g. of nitrilotriacetic acid and 200 milliliters of xylene was heated in a round bottom flask at the boiling point of the mixture (about 138° C.) for about 6 hours. A reflux condenser and Dean-Stark trap were attached to the flask to condense and collect vapor formed by heating. Water separated from the xylene in the trap in the well known manner, and the resulting substantially water-free ethylenediamine-containing xylene condensate was recycled to the round bottom flask. After about 6 hours heating and refluxing the theoretical amount of water had collected in the Dean-Stark trap. The xylene was then distilled from the flask at about 100° C. using reduced pressure. A solid crosslinked substantially water insoluble polymer weighing 41 g. was recovered.

Said crosslinked polymer was found to be an excellent chelating agent for iron ions and for positive ions of the transition group elements.

Iron chelates of said polymer were found to constitute an excellent slow release means for adding iron ions to iron deficient soils.

EXAMPLE II

The general procedure of Example 1 was repeated; however, in this instance the mixture of xylene, ethylenediamine, hydroxyethyliminodiacetic acid, and nitrilotriacetic acid, was heated for only about 1 hour at about 138° C. while removing water substantially as it (the water) was formed. The xylene was then vaporized from the residue which was found to be a water soluble polymer.

The resulting water soluble polymer was taken up in about 100 milliliters of water and centrifuged to remove a small amount of material which did not dissolve in the water.

A sheet of aluminum foil was coated with the thus prepared and centrifuged aqueous solution, dried at about 60–75° C., and heated at about 195–205° C. for about 30 minutes. This treatment resulted in a film of water insoluble cross-linked polymer tightly bonded to the sheet of aluminum foil.

A strip of cotton cloth was immersed in the aforesaid centrifuged aqueous solution and dried at about 65–75° C. The thus dried material was heated to about 195–200° C. for about 20 minutes. This treatment made the cloth water resistant, water repellent, and excellently adapted for use as rain gear and water resistant clothing.

EXAMPLE III

The general procedure of Example I was repeated; however, in this instance 26.9 grams of hydroxyethyliminodiacetic acid, 9.4 grams of nitrilotriacetic acid, 12.1 grams of ethylenediamine and 100 grams of xylene were used. After heating for about 4 hours the xylene was decanted from a xylene insoluble polymer which formed and settled to the bottom of the reaction flask. The thus separated polymer was a brittle solid weighing 41 grams. It was substantially insoluble in cool (e.g., 25–30° C.) water and it swelled in hot (e.g., 90–95° C.) water.

EXAMPLE IV

The general procedure of Example III was repeated. However, in this instance heating was discontinued after about an hour. The xylene insoluble polymer was soluble in water at about 30° C.

EXAMPLE V

The general procedure of Example III was repeated. However, in this instance a mixture of 13.9 g. (grams) of hydroxyethyliminodiacetic acid, 19.0 g. of nitrilotriacetic acid, 10.9 g. of ethylenediamine, and 100 g. of xylene was heated to the boiling point of the mixture. A polymeric material formed and separated as a xylene insoluble lower layer. The xylene was decanted from the polymer and was shown to be pure xylene by evaporation. The polymer was crosslinked and swelled in water (but a small portion of the polymer removed from the reaction flask at an earlier stage in the reaction was completely water-soluble). The polymeric material that formed was less brittle than in Example III, but it was hard and crosslinked.

EXAMPLE VI

The general procedure of Example III was repeated. However, in this instance a mixture of 26.2 g. of hydroxyethyliminodiacetic acid, 9.4 g. of nitrilotriacetic acid, 23.2 g. of 1,6-hexanediamine and 100 g. of xylene was heated at the boiling temperature of the mixture. A lower layer formed and solidified to a hard polymer. The reaction proceeded more slowly than with ethylenediamine; the final polymer which was insoluble in water swelled slightly in hot (85–95° C.) water, and weighed, after drying, 51 g. Evaporation of the xylene gave a small amount of a mixture of hexanediamine and of a low molecular weight polymer.

EXAMPLE VII

The general procedure of Example III was repeated. However, in this instance a mixture of 14.5 g. of hydroxyethyliminodiacetic acid, 19.1 g. of nitrilotriacetic acid, 21.2 g. of 1,6-hexanediamine and 100 g. of xylene was heated for twelve hours at the boiling temperature of the mixutre. A lower layer of xylene insoluble polymeric material formed. This layer was separated by decantation and dried. It weighed 45 g. The polymer was crosslinked and swelled in water. The xylene upper layer on evaporation yielded 5 g. of a mixture of low molecular weight polymer and unreacted starting material, mainly 1,6-hexanediamine.

EXAMPLE VIII

The general procedure of Example III was repeated. However, in this instance a mixture of 26.6 g. of hydroxyethyliminodiacetic acid, 9.2 g. of nitrilotriacetic acid, 12.2 g. of ethanolamine (monoethanolamine) and 100 g. of decalin was heated at 180° C. (the boiling point of the mixture) for six hours. A lower polymeric layer (a crosslinked polymer) was separated and dried in a vacuum oven at 100 millimeters of mercury absolute pressure and 95° C. The dry polymer weighed 40 g. It was insoluble in water and swelled when immersed in hot (ca. 85–95° C.) water.

EXAMPLE IX

The general procedure of Example III was repeated. However, in this instance a mixture of 14.0 g. of hydroxyethyliminodiacetic acid, 18.7 g. of nitrilotriacetic acid, 10.8 g. of ethanolamine and 100 g. of xylene was heated at the boiling point of the mixture (ca. 145° C.) for four hours. A xylene insoluble polymeric layer was separated from the xylene by decantation. The separated xylene gave no residue on evaporation. The separated polymer was crosslinked.

EXAMPLE X

The general procedure of Example I was repeated. However, in this instance the ethylenediamine was replaced with 12.4 g. of ethylene glycol. A xylene insoluble polymer layer was detected in the reaction flask after the mixture therein had been heated for about ½ hour. After heating for 4 hours the mixture was cooled and the xylene was separated by centrifugation from the xylene insoluble polymer. The polymer was dried (substantially freed of xylene) at about 100° C. in a vacuum oven. The dried polymer weighed 42 g.; it was soluble in water, 1 g. of polymer being readily dissolved by about 25 g. of water.

The dissolved polymer was an excellent chelating agent for iron ions.

EXAMPLE XI

The general procedure of Example X was repeated. However, in this instance the refluxing (boiling) mixture was heated for about 15 hours. The resulting polymer (42 g.) consisted essentially of two portions; a first portion which was soluble in water (1 gram dissolved in about 25 ml. of water) and a second portion which was substantially insoluble in water and which swelled when immersed in water at about 85–95° C.

Both fractions were excellent materials for chelating iron ions.

I have also found that in other embodiment of this invention the polymers of said invention can be formed by heating a mixture of the above-named reactants in the mole ratios specified supra at about 160–250° C. for the times specified supra in the absence of an inert liquid medium of the type discussed supra. Water is vaporized from the solvent (inert liquid medium)-free system substantially as it (the water) is formed.

Other solvents (inert liquid media) which are operable in the process of this invention include but are not limited ethylbenzene, propylbenzene, chlorobenzene, 1,2,3,4-tetrahydronaphthalene, tetramethylbenzene, butylbenzene, octyl chloride, decyl chloride, and methylbenzyl chloride. Still other inert liquid media will be, on the basis of my disclosure, readily apparent to those skilled in the art.

Dihydricalcohols (alkylene diols) which are operable in the process of this invention include, but are not limited to; (a) ethylene glycol, the propylene glycols, the butylene glycols, the pentane diols, and the hexane diols; (b) HO—CH$_2$(CH$_2$)$_n$CH$_2$—OH, wherein $n$ is about 5–10 and the isomers thereof including

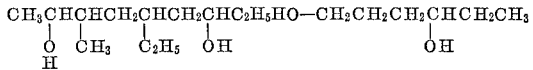

and

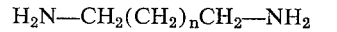

Amino alcohols which are operable in the process of this invention include, but are not limited to; (a) monoethanolamine, the monopropanolamines, the monobutanolamines, the monopentanolamines, the monooctanolamines; and (b) HO—CH$_2$(CH$_2$)$_n$CH$_2$—NH$_2$ where $n$ is about 7–10 and the isomers thereof.

Diamines which are operable in the process of this invention include, but are not limited to; (a) ethylenediamine, the propylenediamines, the butylenediamines, the diaminopentanes, the diaminohexanes, the diaminoheptanes, the diaminooctanes; and (b)

H$_2$N—CH$_2$(CH$_2$)$_n$CH$_2$—NH$_2$ where $n$ is about 7–10 and the isomers thereof.

As used herein the term "percent (%)" means parts per hundred by weight unless otherwise defined where used, and the term "parts" means parts by weight unless otherwise defined where used.

I claim:
1. A crosslinked polymer prepared by a process comprising:
(a) heating at about 130–200° C. for about 10–1000 minutes in an inert liquid reaction medium boiling at about 130–260° C. at 760 millimeters of mercury a reaction mixture consisting essentially of a first compound having the formula HO—G—OH, H$_2$N—G—NH$_2$, or HO—G—NH$_2$, wherein G is an alkylene group having about 2–12 carbon atoms, hydroxyethyliminodiacetic acid, and nitrilotriacetic acid, the mole ratio of first compound:hydroxyethyliminodiacetic acid:nitrilotriacetic acid being about 1:0.2–0.8:0.2–0.8, the weight ratio of first compound to inert liquid reaction medium being about 1:1–20, to form the crosslinked polymer and water while continuously removing the water substantially as it is formed;
(b) separating the crosslinked polymer from the inert reaction medium; and
(c) recovering the separated crosslinked polymer.
2. The polymer of claim 1 in which G is an alkylene group having about 2–6 carbon atoms.
3. The polymer of claim 1 in which the mole ratio of amine:hydroxyethyliminodiacetic acid:nitrilotriacetic acid is about 1:0.3–0.7:0.3–0.7.
4. The polymer of claim 1 in which the reaction mixture is heated at about 135–180° C.

References Cited

UNITED STATES PATENTS 2,463,977   3/1949   Kropa _____ 260—78

FOREIGN PATENTS 842,176   2/1939   France.
44,124   12/1965   Germany.

WILLIAM H. SHORT, Primary Examiner

M. GOLDSTEIN, Assistant Examiner

U.S. Cl. X.R.

117—132, 143; 260—22, 29.2 75, 78, 78.3, 482, 561